Jan. 31, 1956    W. A. ALEXANDER ET AL    2,733,412
SEISMIC AMPLIFIER INTERFERENCE ELIMINATOR
Filed Nov. 19, 1951
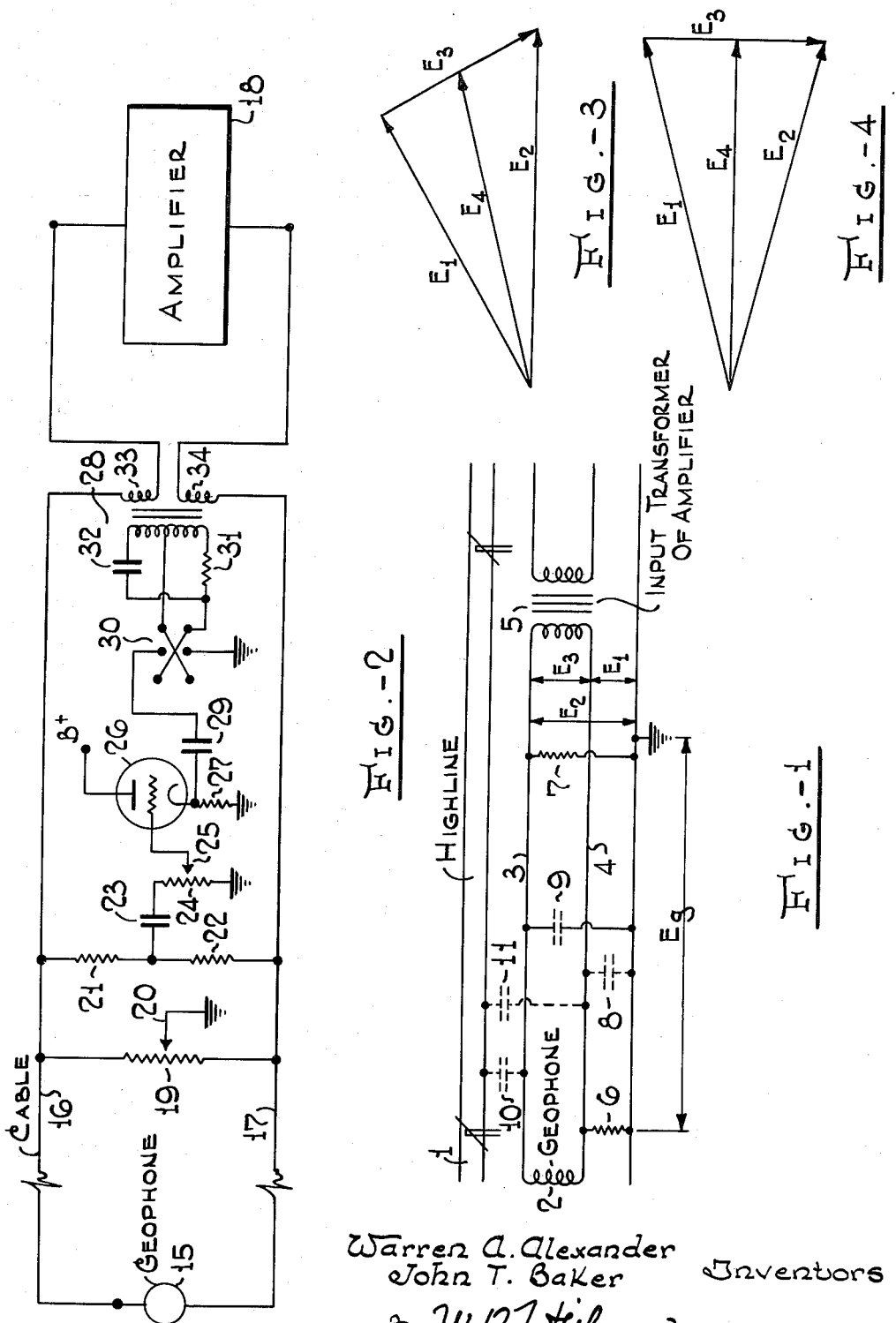
Warren A. Alexander
John T. Baker    Inventors
By W. O. J. Hilman   Attorney United States Patent Office 2,733,412
Patented Jan. 31, 1956

2,733,412

SEISMIC AMPLIFIER INTERFERENCE ELIMINATOR

Warren A. Alexander and John T. Baker, Tulsa, Okla., assignors to Esso Research and Engineering Company, a corporation of Delaware Application November 19, 1951, Serial No. 257,086

7 Claims. (Cl. 333—12)

This invention concerns a method and apparatus for the detection, amplification, and recording of seismic waves so as to eliminate stray signals of an undesired character. The invention provides a simple and effective manner of developing a voltage which is equal in magnitude and opposite in phase to the resultant of interfering voltages which may be picked up by a seismic detection system, making it possible to inject this developed voltage into the system to fully cancel the effects of the undesired interfering voltages.

The seismic prospecting method is widely used at present in the attempt to locate favorable areas for oil prospecting. The required seismic equipment is generally portable in nature and transported on vehicles over the area to be prospected. Frequently highways along which prospecting may conveniently be conducted are flanked by power transmission lines which generally carry alternating current having a frequency of 60 cycles per second. These power lines serve to introduce undesired extraneous voltages into seismic detection systems which decrease or eliminate the intelligibility of seismic records. This is particularly true since in many cases the frequency of the desired seismic signal is near the frequency of the objectionable extraneous voltages developed by proximity to transmission lines. Again, in many cases the magnitude of significant seismic signal variations is less than the magnitude of interfering voltages resulting from adjacent power lines.

This general problem has long been appreciated and many suggestions have been made as to its solution. For example, it has been appreciated that one way of eliminating the effect of an interfering voltage is to develop a "bucking" voltage equal in magnitude and opposite in phase to the interfering voltage. Insertion of such a bucking voltage together with the interfering voltage to a seismic detection system clearly would serve to eliminate the effect of the interfering voltage. However, a practical and effective manner of developing and injecting such a bucking voltage has not heretofore been suggested. Not only must means be provided for developing a suitable bucking voltage, but in addition the controls required to accomplish this objective must be sufficiently simple and readily usable so as to make the system of practical application. In this connection, for example, development of a bucking voltage by a circuit requiring the dependent adjustment of two or more controls is hopelessly cumbersome as applied to practical seismic prospecting. Thus, since as many as 20 or more individual seismic amplifying circuits are employed simultaneously and since frequent changes of location for this equipment are required, a simple, rapidly adjusted interference elimination system must be provided.

The present invention admirably fulfills these general objectives. The invention permits simple rapid development of a bucking voltage of a nature to fully eliminate undesired interfering signals. The present invention is the outgrowth of basic studies as to the source and nature of disturbing voltages providing the groundwork for a simple correction system. In operation this correction system only necessitates the adjustment of two independent controls. The first of these controls is operative to reduce the magnitude of the resultant interference voltage and develop a voltage which is 90° out of phase with the vector resultant of all interfering voltages. After a 90° phase shift of this developed voltage, by adjusting the magnitude of this developed voltage by a second control, full elimination of the interfering voltage is readily achieved.

In order to fully disclose the nature of the present invention, reference is made to the accompanying drawings in which:

Figure 1 diagrammatically illustrates the manner in which interfering voltages are developed in a geophone system by nearby transmission lines;

Figure 2 diagrammatically represents a preferred embodiment of the invention for developing a bucking voltage to eliminate undesired interfering voltages from such a transmission line; and Figures 3 and 4 are vector diagrams of interfering and bucking voltages developed in this system.

Referring to Figure 1, a transmission line 1 is diagrammatically illustrated. It is assumed that it is desired to employ a geophone and associated seismic amplifying and recording equipment in the general vicinity of this transmission line. Thus a geophone 2, electrically connected to a cable having two conductors 3 and 4 leading to a transformer 5 employed as an input transformer for a seismic amplifier, is illustrated as being adjacent the transmission line 1. The problem of interfering voltage generation in the geophone system and the solution to this problem is not affected appreciably by the relative positioning of the geophone system and the transmission line; as illustrated, however, the geophone cable and the transmission line are in a generally parallel relationship. In the system illustrated, there is effective resistance between each of the geophone conductors 3 and 4 and the ground, as illustrated by resistors 6 and 7. In addition there is effective capacitive reactance as indicated by 8 and 9 between these same points. Finally, there is effective capacitive reactance between each of the geophone conductors 3 and 4 and the lines of the transmission system identified by numerals 10 and 11. Interfering voltages attributable to the transmission lines which are developed in the geophone system may be accounted for in terms of these coupling impedances.

A voltage designated as $E_g$ exists which appears to be the result of earth return currents generally introduced into the earth by an unbalanced condition of the A. C. distribution system, and which occurs in part due to the direct induction of voltage in the ground by the transmission lines. The voltages $E_1$ and $E_2$, existing between each of the geophone conductors and the ground, are a function of voltage $E_g$ appearing across the points indicated due to coupling through the leakage resistances and the distributed capacitances illustrated. In addition $E_1$ and $E_2$ are developed by the coupling of the distributed capacity of the two geophone conductors and the transmission line as formerly identified. A third factor contributing to the generation of $E_1$ and $E_2$ is the inductive coupling between the transmission line and the geophone conductor. However, it has been determined that inductive coupling of this character is a relatively small effect.

Consequently, as indicated, a first voltage $E_1$ and a second voltage $E_2$ are established between each of the geophone conductors and ground due to coupling of the nature identified. The voltage $E_3$ existing between the two geophone conductors is the resultant of voltages $E_1$ and $E_2$, and is the disturbing voltage to be eliminated. Each of the voltages $E_1$ and $E_2$ and $E_3$ may be represented as vector quantities and may be combined as vectors. Consequently, the resultant voltage $E_3$ may be the result of either a phase difference or a magnitude difference between $E_1$ and $E_2$.

The vectorial relationship of voltages $E_1$, $E_2$, and $E_3$ is diagrammatically illustrated in Figure 3 of the drawings. It may be observed that generally $E_1$ and $E_2$ are substantially greater than $E_3$. In a typical case $E_1$ and $E_2$ may be of the order of 50 millivolts, while $E_3$ may be of the order of about 50 microvolts.

The magnitude and phase relationships of voltages $E_1$ and $E_2$ are principally affected by the leakage resistance, that is, resistances 6 and 7 between the geophone conductors and ground. When the leakage resistance to ground is low, voltages $E_1$ and $E_2$ are small, but there is usually a considerable phase difference between them so that the resultant voltage $E_3$ is large. When the leakage resistance between the geophone conductors and the ground is greater, the voltages $E_1$ and $E_2$ are greater in magnitude, but will be very nearly in phase. As a result, the interference voltage $E_3$ is small.

In accordance with this invention as the first step of developing a suitable bucking voltage for cancellation of the interference voltage, $E_1$ and $E_2$ are adjusted to have the same magnitude. This may be simply accomplished by positioning a potentiometer between the conductors of the geophone cable, connecting the center tap of the potentiometer to ground. By variation of the center tap position, either one of the voltages $E_1$ or $E_2$ can be made equal to zero, so that by suitable adjustment the magnitude of voltages $E_1$ and $E_2$ may be made equal even in extreme cases of magnitude and phase differentials. Control of the potentiometer to equalize voltages $E_1$ and $E_2$ also has the effect of causing $E_3$, the resultant interfering voltage, to assume a minimum magnitude. The vectorial relationship of the three voltages in the case in which $E_1$ and $E_2$ are equalized is illustrated by Figure 4. It will be observed that by equalizing $E_1$ and $E_2$, the vectorial diagram becomes an isosceles triangle. The next step of the process is to secure a voltage having a fixed phase relationship to voltage $E_3$. Referring to Figure 1, such a voltage would be obtained between ground potential and a center tap of the primary coil of the input transformer, for example. This voltage may be designated as $E_4$, having the vectorial relationship illustrated in Figure 4. As stated, $E_4$ when derived in this manner from a center tapped impedance between the geophone conductors, will in all cases have a 90° phase relationship to voltage $E_3$, when $E_1$ and $E_2$ have been equalized in magnitude. Such a voltage may readily be obtained from the center tap to ground of a resistive, capacitive, or inductive impedance or combinations of these connected between the geophone conductors. In Figures 3 and 4, the vector diagrams are simplified by eliminating the vector voltages appearing across the centertapped impedance, since, by maintaining a high ratio of impedance from centertap to ground to the centertapped impedance, the magnitude of the vector $E_4$ is essentially that shown in the diagrams.

Thereafter it is only necessary to adjust the magnitude of this derived voltage, after an additional fixed 90° phase shift, so as to obtain a voltage equal in magnitude to the interference voltage, but opposite in phase so as to effectively cancel the interference voltage when properly injected into the geophone system.

An adaption of this general process for eliminating 60 cycles per second interference voltages as embodied in a preferred apparatus will now be described with reference to Figure 2 of the drawings. Referring to Figure 2, a geophone 15 is illustrated which by means of a cable containing the two conductors 16 and 17 is connected to a suitable amplifier 18. In order to equalize the voltages between each of the conductors 16 and 17 and ground, a resistor 19 is connected between the two conductors. The variable tap 20 of this resistor is connected to ground. As described, by suitable adjustment of the moving contact of resistor 19, the interference voltage identified as $E_3$ on the vector diagrams may be made a minimum by equalizing voltages $E_1$ and $E_2$. This condition is readily determined by adjusting the moving point of resistor 19 while the geophone is receiving no seismic signal so as to cause the output of amplifier 18 to attain a minimum. It is apparent that in place of the variable resistor 19, variable inductive or capacitive impedances could be employed for the same purpose.

In order to derive a voltage having a fixed 90° phase relationship with the resultant of the interference voltages, when $E_1$ and $E_2$ have been equalized, a center tapped impedance is connected between the geophone conductors. Thus, in Figure 2, two equal resistors 21 and 22 are connected in series between conductors 16 and 17. As a result, the voltage between the junction of these resistors and ground as formerly described will in all cases have a phase relationship of 90° with respect to the resultant interfering voltage when $E_1$ and $E_2$ are equal in magnitude. Again, it may be observed that resistors 21 and 22 may be replaced with equal inductive or capacitive impedances. The critical requirement of these elements is that they provide the same impedance between the junction of the two impedances and each of the geophone conductors.

The voltage derived from the center tap of the balanced impedances between the geophone conductors may be injected into the geophone system in a variety of ways so as to effectively cancel the interference voltages. However, it is a particular feature of the present invention to conduct the injection of this bucking voltage in the manner to be described.

While direct coupling or transformer coupling of the voltage from the junction of the balanced impedances may be employed if desired, it is preferred to employ a coupling condenser 23 for this purpose. The coupling condenser is preferably connected to a voltage divider 24 having one end thereof connected to ground and having a variable resistance tap 25. The voltage divider 24 will thus function as a gain control so as to variably adjust the magnitude of the bucking voltage, voltage $E_4$, as desired. Thus, by varying the position of voltage tap 25, the output of amplifier 18 may be reduced to nil when the geophone 15 is receiving no signal. In other words, the interference voltage in the system may be completely eliminated by a suitable adjustment of voltage divider 24 when this signal is properly injected into the geophone system.

To accomplish this objective it is preferred to utilize a cathode follower circuit. Thus the tap of voltage divider 24 is connected to the grid of vacuum tube 26 illustrated as a triode. When a suitable source of voltage is applied to the plate of tube 26, the desired bucking voltage may be obtained from the cathode of tube 26 which is connected to ground through a cathode resistor 27. Use of this cathode follower circuit in this application is particularly valuable so as to provide a high input impedance to ground, while providing a low output impedance. The voltage obtained from the cathode of tube 26 is then supplied to the transformer 28 through coupling condenser 29 and reversing switch 30. The circuit composed of resistor 31, condenser 32, and transformer 28 is one well known by those skilled in the art by which the 60 cycle per second source voltage $E_4$ is shifted a fixed 90° such that the direction of the vector $E_4$ lies parallel with that of the resultant interference voltage $E_3$. By connecting one terminal of the reversing switch to the center tap of the primary coil of transformer 28 and by connecting the terminations of the primary coil to the reversing switch as illustrated through resistor 31 and condenser 32, 180° phase shift of the bucking voltage may be obtained by operation of reversing switch 30. This provision for reversal in phase by 180° of the bucking voltage derived as described, is essential since the interference voltage $E_3$, after equalizing the amplitude of $E_1$ and $E_2$, can be 90° out of phase in either direction with the center tap voltage $E_4$. However, by operation of this system, as described, and by operation of a reversing switch 30, a bucking voltage is obtained, equal in magnitude and opposite in phase to the interference voltage.

This bucking voltage is then supplied to the geophone system through transformer 28, illustrated as having two secondary coils 33 and 34, connected in series with the input leads to the amplifier 18 between the amplifier and the center-tapped impedance. By this means the bucking voltage is suitably supplied to the geophone system as to permit cancellation of the interference voltage.

The simple operation of the apparatus described may now be appreciated. In setting up a geophone detection system in a new locality, the first step is to adjust variable resistor 19 so as to provide a minimum output as indicated, for example, by a recorder associated with amplifier 18. Thereafter, voltage divider 24 is adjusted so that no output is obtained at amplifier 18, if necessary reversing the position of switch 30 to obtain this result. These simple steps will thus provide complete cancellation of interference voltages picked up by A. C. transmission lines and the like in the vicinity of the geophone system.

What is claimed is:

1. In a seismic amplifier system having a geophone electrically connected to an amplifier through two electrical conductors, the improvement which comprises a first impedance connected between said conductors having a variable tap connected to ground potential, second and third impedances of equal value connected between each of said conductors and a common connection, a fixed 90° phase shift system having its input electrically connected across said common connection and ground potential including a voltage magnitude control, and circuit means coupling the output of said fixed phase shift system to the said amplifier.

2. The apparatus defined by claim 1 in which said first impedance consists of a potentiometer.

3. The apparatus defined by claim 1 in which said second and third impedances consist of a center tapped impedance element having the center tap connected to the phase shift system.

4. The apparatus defined by claim 1 in which the said circuit means coupling the output of the phase shift system to the amplifier is a transformer.

5. In combination in a geophone-amplifier system in which the geophone is electrically connected to the amplifier through two conductors, a first impedance connected between said conductors having a variable tap connected to ground potential, a second impedance connected between said conductors having a center tap, a voltage divider connected to said center tap and ground potential having a variable output tap, a cathode follower circuit and a 90° phase shift circuit, the input of said cathode follower circuit being connected to the variable output tap of said voltage divider and the output of said cathode follower circuit being connected to the input of the said 90° phase shift circuit, and means to connect the output of the said phase shift circuit to the said amplifier.

6. In a method for cancelling interfering voltages from a seismic energy amplifier system having a geophone electrically connected to an amplifier through two electrical conductors, the steps which comprise: equalizing the magnitude of interfering voltages between each of said conductors and ground potential, thereby leaving a resultant voltage between the two conductors due to a difference in phase between the magnitude-equalized interfering voltages in the two conductors, deriving from said resultant voltage a first voltage having a 90° phase relation with the said resultant of said equalized interfering voltages, shifting the phase of said first voltage by 90°, and injecting said phase shifted first voltage into the said amplifier, thereafter adjusting the magnitude of said phase shifted voltage injected into the amplifier to secure minimum output from the amplifier when the geophone is receiving no seismic energy.

7. In a seismic amplifier system, including a geophone electrically connected to an amplifier through two electrical conductors, the improvement which comprises means for equalizing, with respect to a fixed ground potential, the magnitude of interfering voltages generated in each of said conductors, leaving between the two conductors a resultant voltage due to phase differences between the magnitude equalized voltages, means for developing from said resultant voltage, in conjunction with said magnitude equalizing means, a first voltage 90° out of phase with said resultant voltage, fixed phase shifting means for shifting the phase of said first voltage by 90°, to thereby provide a second voltage 180° out of phase with said resultant voltage, means for adjusting the magnitude of said second voltage to make it equal to the magnitude of said resultant voltage and means for injecting said adjusted second voltage into said amplifier whereby to cancel said resultant voltage.

References Cited in the file of this patent

UNITED STATES PATENTS

| | | |
|---|---|---|
| 1,544,622 | Affel | July 7, 1925 |
| 1,569,905 | Affel et al. | Jan. 19, 1926 |
| 2,135,037 | Landon | Nov. 1, 1938 |
| 2,164,196 | Woodyard et al. | June 27, 1939 |
| 2,294,627 | Parr | Sept. 1, 1942 |
| 2,438,217 | Johnson | Mar. 23, 1948 |
| 2,589,184 | Zinn | Mar. 11, 1952 |